United States Patent [19]
Thomas et al.

[11] Patent Number: 5,190,130
[45] Date of Patent: Mar. 2, 1993

[54] PROCESS FOR REGULATING A CLUTCH

[75] Inventors: Christian Thomas, Zoetermeer, Netherlands; Gerald Rowe, Lindau, Fed. Rep. of Germany; Wolf-Dieter Gruhle, Tettnang, Fed. Rep. of Germany; Wolfgang Maier, Markdorf, Fed. Rep. of Germany

[73] Assignee: Zahnradfabrik Friedrichshafen AG, Fed. Rep. of Germany

[21] Appl. No.: 690,967

[22] PCT Filed: Nov. 15, 1989

[86] PCT No.: PCT/EP89/01369
§ 371 Date: May 15, 1991
§ 102(e) Date: May 15, 1991

[87] PCT Pub. No.: WO90/05866
PCT Pub. Date: May 31, 1990

[30] Foreign Application Priority Data

Nov. 17, 1988 [DE] Fed. Rep. of Germany ....... 3838908

[51] Int. Cl.$^5$ .............................................. F16D 41/02
[52] U.S. Cl. .................................. 192/0.032; 192/3.31
[58] Field of Search ............................. 192/0.032, 3.31

[56] References Cited

U.S. PATENT DOCUMENTS

| | | | |
|---|---|---|---|
| 3,598,211 | 8/1971 | Fergle | 192/0.032 |
| 3,826,218 | 7/1974 | Hiersig et al. | 192/0.032 X |
| 4,577,737 | 3/1986 | Niikura et al. | 192/0.032 |
| 4,582,185 | 4/1986 | Grimes et al. | 192/3.31 X |
| 4,708,227 | 11/1987 | Kitade | 192/0.032 X |
| 4,725,951 | 2/1988 | Niikura | 192/3.31 X |
| 4,757,886 | 7/1988 | Brown et al. | 192/3.31 X |
| 4,760,761 | 8/1988 | Nishikawa et al. | 192/3.31 X |
| 4,766,544 | 8/1988 | Kurihara et al. | 192/0.052 X |
| 4,807,130 | 2/1989 | Deutsch et al. | 192/0.032 X |
| 4,821,190 | 4/1989 | Patil | 192/0.032 X |

FOREIGN PATENT DOCUMENTS

| | | | |
|---|---|---|---|
| 0153798 | 9/1985 | European Pat. Off. | |
| 3121749 | 2/1982 | Fed. Rep. of Germany | |
| 2483649 | 12/1981 | France | |
| 60-1458 | 1/1985 | Japan | 192/3.31 |
| 61-27365 | 2/1986 | Japan | 192/3.31 |
| 2-203072 | 1/1989 | Japan | 192/0.032 |
| 2-256962 | 3/1989 | Japan | 192/3.31 |
| 2079888 | 1/1982 | United Kingdom | 192/0.032 |
| 2081413 | 2/1982 | United Kingdom | |

*Primary Examiner*—Leslie A. Braun
*Assistant Examiner*—Nicholas Whitelaw
*Attorney, Agent, or Firm*—Davis, Bujold & Streck

[57] ABSTRACT

In a process for regulating a clutch which is situated within a power train between an input shaft (22) and an output shaft (24), the rotation-rate differences Δω of the power train are detected via a sensor device. With the use of regulating equipment and depending on a control variable x, a correcting variable y which affects the speed difference Δn is controlled. To provide regulating equipment at favorable construction cost, the regulating equipment has a comparator unit (51) in which an actual value x of the rotation-rate difference Δω in the power train behind the clutch (21) is compared with a preset fixed limited value $w_{const}$, the rotation-rate difference Δω being limited to the limit value $w_{const}$ by changing the correcting variable of the clutch (21) upon reaching or exceeding the limit value $w_{const}$.

24 Claims, 5 Drawing Sheets

PROCESS FOR REGULATING A CLUTCH

BACKGROUND OF THE INVENTION

1. Field of the Invention

The invention concerns a process for regulating a clutch situated within a power train between an input and an output shaft. A sensor device, including regulating equipment, is provided in the power train for detecting a rotation-rate difference $\Delta\omega$ which, in accordance with a controlled variable detected by the sensor device, controls a correcting variable which is to be fed to the clutch and affect the speed difference $\Delta\omega$.

2. Description of the Related Art

A process of the above kind was disclosed in German Patent 31 21 749. Torsional vibrations, due to rotational irregularity of a drive unit that actuates the input shaft, which are transmitted to the output shaft, are prevented by means of a regulated slip condition of the clutch. Depending on the difference in the speed or rate or rotation of the input shaft, which is a dimension of the torsional vibration, a speed difference between the input and the output shafts causes a certain condition of slippage in the clutch. Here the speed difference between the input and the output shafts must always assume a higher value than the difference of speed or rate of rotation of the input shaft. The realization of such a regulation process is relatively expensive, since the relation of the speed or rotation-rate difference of the input shaft to the speed difference between input and output shafts is to be laid down as a characteristic line in the desired value pickup. The rotation-rate difference of the input shaft is measured. The process is further carried out by means of a device which has a value unit which adjusts the actuation pressure in the clutch. Component parts of the value unit are a directional valve and a solenoid valve that pilot controls the directional valve and is operated by pulse-width modulation. The solenoid valves of this construction have the disadvantage of being dependent on the temperature of their control pressure.

Therefore, the invention is based on the problem of eliminating said disadvantages and thus providing a simple process for regulation of a clutch which can be carried out at low cost in control engineering and construction.

SUMMARY OF THE INVENTION

In a process of the above mentioned kind, said problem is solved by the fact that the regulation equipment has a comparator unit which compares an actual value of the rotation-rate difference detected in the power train behind the clutch with a present stable limit value and, upon reaching or exceeding said limit value, the rotation-rate difference $\Delta\omega$ is limited to the limit value by modifying a correcting variable of the clutch. Said limit value can be detected in test series for differently designed power trains and motor vehicles as a dimension of the rotation-rate difference $\Delta\omega$ in which a vibration stimulation in the power train, and in the structural parts connected therewith, assumes a magnitude in which buzzing and rattling noises do not yet occur within the power train and structural parts. A regulation according to the process of the invention in which only the rotation-rate difference signal is compared with the limit value requires only a small expense in control engineering.

The invention refers to a process for regulation of a clutch which is situated within a power train of a motor vehicle between an input shaft connected with an internal combustion engine and an output shaft connected with a transmission unit, including a pickup for determining a differential speed $\Delta n$ of input and output shafts, a sensor device for detecting a rotation-rate difference $\Delta\omega$ and regulating equipment which, according to the controlled variable detected by the pick-up, controls the correcting variable to be fed to the clutch and which affects the speed difference $\Delta n$.

The problem on which the invention is based is solved in the process by the fact that to a desired value pickup, coordinated with the regulating equipment, there are fed operational parameters of the internal combustion engine which causes rotation-rate differences $\Delta\omega$ in the power train based on which the desired value pickup determines a desired value of the speed difference. The desired value and the controlled variable are fed to an adding unit (comparator) of the regulating equipment, and the rotation-rate difference $\Delta\omega$ is fed to a second desired value pickup which, upon reaching or exceeding a limit value of the rotation-rate difference, immediately feeds a second desired value to the adding unit (comparator) or to the first desired value pickup adaptively controlling the first desired value thereof. Accordingly, there exists a first control circuit consisting of the pickup that determined the differential speed $\Delta n$ as a controlled variable and of the first desired value pickup which forms a first desired value from the operational parameters of the internal combustion engine. To said first control circuit is superposed a second control circuit having the sensor device which detects the rotation-rate differences $\Delta\omega$ and the second desired value pickup. The second desired value pickup can adaptively control the desired value of the first desired value pickup or act directly upon the adding unit (comparator) in the sense of raising the desired value. Depending on the operational parameters of the internal combustion engine, the first desired value pickup presets a desired differential speed $\Delta n$ based on which a specific correcting variable is adjusted for the clutch in the regulation equipment after comparison with the controlled variable $\Delta n$ actual. The first desired-value pickup is designed in a manner such that under normal conditions the differential speed $\Delta n$ on the clutch suffices to prevent body buzzing in the motor vehicle.

However, if this problem, and therewith an overstepping of a specific value of the rotation-rate difference $\Delta\omega$, appears, then the second desired value is issued to the adding unit (comparator) through the second desired-value pickup or the first desired-value pickup is adapted so as to issue a higher desired value. If the second desired-value pickup issues to the adding unit (comparator) a second desired value, the latter is cumulatively superposed on the first desired value.

In another alternative case, the second desired-value pickup can adapt the first desired-value pickup so that the latter issues a higher desired value. The increased desired value for a specific operational parameter is detected by the desired-value pickup in a manner such that the later automatically issues an increased desired value upon the appearance of the same operational parameters. In this manner, it is possible to adjust a smaller clutch slip and peak it by means of adjusting the desired-value pickup from case to case so that the transfer of rotation-rate differences to the output shaft is reduced to a value in which no body buzzing occurs.

The second desired-value pickup can likewise control the first desired-value pickup or cumulatively superpose the second desired value on the first desired value in a manner such that the clutch slip does not assume unnecessarily high values if very small rotation-rate differences $\Delta\omega$ appear when reaching the differential speed preset by the first desired-value pickup. Thus, a disadvantage of having the regulation fixed on a limit value, which is based on the restricted dynamic of the regulation system, is overcome. If in this regulation which is fixed on a limit value, there is actually detected a higher value of the rotation-rate difference $\Delta\omega$, there must first be built up in the clutch the necessary speed difference $\Delta n$ in order to be able to dampen the vibrations. During this phase and under certain circumstances, it is temporarily not possible to prevent body buzzing in the motor vehicle. In this condition, the slip condition should not occur at a value below the limit value. For this reason, the regulation system has the first regulation circuit which, on the basis of the operational parameters of the internal combustion engine, adjusts the differential speed $\Delta n$ according to the characteristic line. The dynamic of the system can thus be considerably improved. Here the second regulation circuit superposed on the first regulation circuit has the regulation laid out to a limit value of the rotation-rate difference.

In another advantageous embodiment of the solution according to the invention, the slip between the input and the output shafts must be limited to a maximum value $\Delta n_{max}$ and/or a maximum slip duration depending on the engine load. In this manner, damage suffered as a result of the clutch slip of long duration or of the magnitude of the clutch slip is prevented. If such conditions are registered, it is possible, upon reaching or exceeding the maximum speed difference and/or the maximum slip duration, to increase or reduce the limit value by a correcting value K. A reduction of the limit value by the correcting value K results in disengagement of the clutch and thus in the clearing of the slip condition, since the regulation circuit then allows only minimal $\Delta\omega$. This state of increase of the limit value is only canceled again when there is no longer present any rotation-rate signal $\Delta\omega$ that dissolves the speed difference $\Delta n$. Thus in a simple way it is possible to effect the limitation of slip duration and slip value.

As a proposed advantageous embodiment, the load can be detected as an operational parameter of the internal combustion engine, and below a certain load in the traction and the coasting operation of the motor vehicle, the correcting value of the clutch can be changed to an increased speed difference $\Delta n$. It is also advantageous to detect the load-change speed of the internal combustion engine and when a maximum value of said load-change speed is exceeded, to increase the desired value of the speed difference $\Delta n$ of input and output shafts when the load is reduced and to reduce or keep it constant when the load increases. The object of the regulation is to keep the actual value of the differential speed of the clutch constant even in the case of a quick change of the engine torque. When a high load-change speed is registered, the regulation signal $x_w$ is increased by a sudden change of the desired value by means of the comparator unit so that the regulating action becomes stronger and there can be prevented an excessive increase of the differential speed in the case of a quick load increase or an engaging of the clutch in the case of quick load decrease.

The actual value of the speed difference $\Delta n$ is to be continuously compared in a comparator unit with a desired value which corresponds to a very low rotation-rate difference $\Delta\omega$. The error resulting therefrom is fed to regulation equipment which has a proportional part and an integral part, the proportional part being changeable depending on the engine load. As the engine load is increased, the proportional part can be enlarged and in case of great errors $x_w$ and/or quick change of the engine load, the integral part can be changed in the sense that its regulating action is reinforced. The proportional part can be changed according to the load-change speed in a manner such that as the load-change speed increases, the proportional part becomes enlarged. Finally, the proportional part can be formed depending on the error $x_w$ of the adding unit (comparator) in a manner such that a factor of the proportional part can be enlarged with greater deviations. Thus, the regulating parameters are adapted to different operational conditions of the regulation path with the object of keeping the deviations in different conditions of operation as small as possible. Besides, when the deviation $x_w$ diminishes, the danger of engaging the clutch coordinated with the hydrodynamic torque converter is prevented by the fact that the (opening) regulating action is stronger.

In an embodiment of the regulation process of the invention, a specific correcting variable is coordinated with each value of the load of the internal combustion engine in the regulating equipment. Thereby, the pressure coordinated with the torque is adjusted depending on the load without a great deviation having to occur first. This step assists the regulation process.

Developing the regulation process further, the engaging force of the clutch must continuously be adapted to the value of the load, there being seen from the stored operational parameters the tendency to displace the correcting variable needed for a certain engaging force in the stationary state of operation at the moment and from which are deduced the changes of coordination needed for the adaptation. Thereby the advantage will always be kept to the same extent and will not be diminished by changes of the coordinations (for example, changes of frictional values).

It is also proposed that the regulation have an additional first signal path by which the delayed change of a controlled variable and the retardedly effective change of engaging force of the clutch, upon quick engine-load changes, can be compensated by means of an adapted value and of a time-function element which acts as a delayed differential element which simulates the dynamically delayed behavior of the controlled variable (clutch pressure) and of the effective engaging force. With this step, the delayed conversion to a controlled variable (clutch pressure), the delay determined by the regulation system, and a corresponding engaging force are compensated by the output value of the control unit (control current) adaptively assuming greater or smaller values than needed for stationary operation conditions.

In another embodiment of the regulation process of the invention, the correcting variable must be quickly lowered via a second signal path with a preset timed gradient when the speed difference falls below its desired value or an additional threshold below the desired value. This function prevents the engaging of the clutch when the speed difference lowers excessively due to a quick, controlled lowering of pressure, especially, when for reasons of stability, said quick lowering of pressure is not possible by the governor alone.

There is also provided a pickup element that detects the torque flow resulting via the clutch in the traction and the coating operation and then, when no torque flow takes place, it sets the correcting variable to zero from where the control is again started when a buildup of torque reoccurs. If an operation condition without torque flow appears, then the clutch pressure must be lowered to zero as soon and as completely as possible so as to prevent an undesired engaging of the clutch which impairs comfort. This can be obtained with the steps described without considering whether specific signal paths of the regulation equipment adjust another temporary higher value of the correcting variable.

In a process according to the invention for regulating a clutch which is shifted in parallel within a power train with a hydrodynamic clutch situated between the internal combustion engine and the transmission, when falling below a first temperature limit value of the cold water of the internal combustion engine or of the lube oil of the transmission, the clutch is automatically actuated to its disengaged state. At the same time, there is provided above the first temperature limit value a second temperature limit value. The speed difference is increased between the first lower and the second upper temperature limit values. Alternatively there exits the possibility, that there be provided above the first temperature limit a second temperature limit, the present speed difference being canceled according to a defined characteristic line when as the temperature increase the first temperature value is exceeded to reach the second temperature limit value. In addition, temperature information above the engine oil temperature or the engine cold water temperature is available to the control device for a short time after a start from a control electronic system of the internal combustion engine, there being set with the temperature value a time-dependent characteristic line according to which an increased speed difference is canceled. Below the first temperature limit value is a clutch cannot be satisfactorily regulated due to the high engine irregularity when the engine is cold and to the high oil viscosity. At high operational temperatures, which nevertheless still do not correspond to the usual operational temperature (limit value 2), the engine irregularity and the oil viscosity are further increased so that comfortable operational conditions can be adjusted with an increased clutch slip. At low oil temperatures there exits no danger of the clutch burning.

In an apparatus for carrying out the process in which the clutch is designed as friction clutch, a correcting element which engages and disengages the clutch is actuatable as a correcting variable on both sides via actuation spaces with a hydraulic actuation pressure regulated by the regulating equipment. By such double-effect actuation of the clutch, it is possible to adjust regulated slip conditions or a complete disengagement of the clutch without difficulty. Additionally, coordinated with each actuation space is a regulating value which adjusts the actuation pressure, both regulating valves being actuable by pilot control pressure adjusted by the regulating equipment.

A first regulating valve which adjusts the actuation pressure in a first actuation space of the friction clutch can be hydraulically pilot controlled and by means of its piston slide valve, in a first terminal position at low pilot pressure or a pilot pressure equal to zero, pressurize the first actuation space. In a second terminal position, at elevated pilot pressure, the first regulating valve can drain the first actuation space, as well as pressurize with pilot pressure the second regulating valve and adjust the piston slide valve thereof in a manner such that the second actuation space is pressurized with a hydraulic actuation pressure. This serial arrangement of both regulating valves within the line that guides pilot pressure results in delays in the shifting of the two valves and thus in a damping of the shift operations of the clutch.

A lubrication valve designed as 3/2 directional valve is attached to the main pressure system and to a drain terminal of the second regulating valve. The drain terminal in its first position removes pressurized fluid from the second actuation space. The lubrication valve, in its two shift positions, feeds at a given time pressurized fluid to the transmission from the main pressure system or the discharge terminal for lubrication. Consequently, a safe supply of lubricant to the transmission of the motor vehicle is obtained and a separate lubricant pump can be eliminated. The lubrication valve can be pilot controlled with the pressure of the pilot control line, while, alternately, the lubrication valve can be pilot controlled with the pressure of the drain terminal of the second directional valve.

In a further development of the invention, in the pilot control line is situated an electromagnetic pressure-control value which acts proportionally to the current. Said pressure-control valve adjusts proportionally to an electric control current, the pilot control pressure acting upon both directional valves and optionally upon the lubricant valve, and the control pressure being to a great extend independent of the temperature of the pressurized fluid. To dampen the pressure vibrations caused in the pilot control line by the pressure-control valve during the control operations, it is possible to situate a hydraulic damping element in the pilot control line.

Finally, the electronic control of the pressure-control valve is designed to detect speeds or speeds differences, by providing a multipolar slotted disc or a gear that interacts with a speed sensor, there being produced in a rear-mounted pulse cam processor exactly the same pulse cams from which are determined in a consecutive band-pass filter residual ripples and selective corner data of the rotation-rate signal. Then, in a rear-mounted step, an output voltage having a direct relation to the actual value is produced.

This control makes it possible to selectively pick up at comparatively low cost torsional vibrations contained in a frequency-modulated form in the signal course of the speed sensor.

The corner data of the band-pass filter is decisive for the operation of the control. Effects are obtained which decisively affect the quality of the output signal. The skilled selection of the cut-off frequencies of the band-pass filter makes it possible to suppress or accentuate a discrete torsional vibration portion in the range of the operational speed. Therefore, even the smallest vibrational amplitudes, which lead to excitations of the torsional vibrations and thus to buzzing, are available as a "actual value signal" for the control circuit. This step also results in the improvement of the signal/noise ratio and allows altogether a control design which is stable for a long time, and in relation to temperature according to the requirements. At the same time, the signal release is increased so that the smallest rotation-rate differences ($\Delta\omega < 0.1$ rad/sec) can be levelled.

In the initial stage, not only a direct voltage proportional to the alternating amplitude of the torsional vibration is produced. A rear-mounted low-pass filter effects the suppression, for example, of disturbances which appear as torsional vibration over mode of travel and road influences. This means that with any narrow-band pass behavior and adequately adapted limit frequency of low-pass filter 2, it is possible to feed to the control circuit in the form of an "actual value-direct voltage" a discrete buzzing resonance frequency free of remaining disturbances. The working point of the regulator can be set so as to have more than 50% of the available signal amplitude for buzzing control.

The invention is not confined to the combination of features of the claims. Other logical possible combinations result for the expert from claims and specific features of the claims according to the existing problem.

BRIEF DESCRIPTION OF THE DRAWINGS

For further explanation of the invention reference is had to the drawings where embodiments are shown in simplified manner. In the drawings.

DESCRIPTION OF THE PREFERRED EMBODIMENTS

Figure 1:
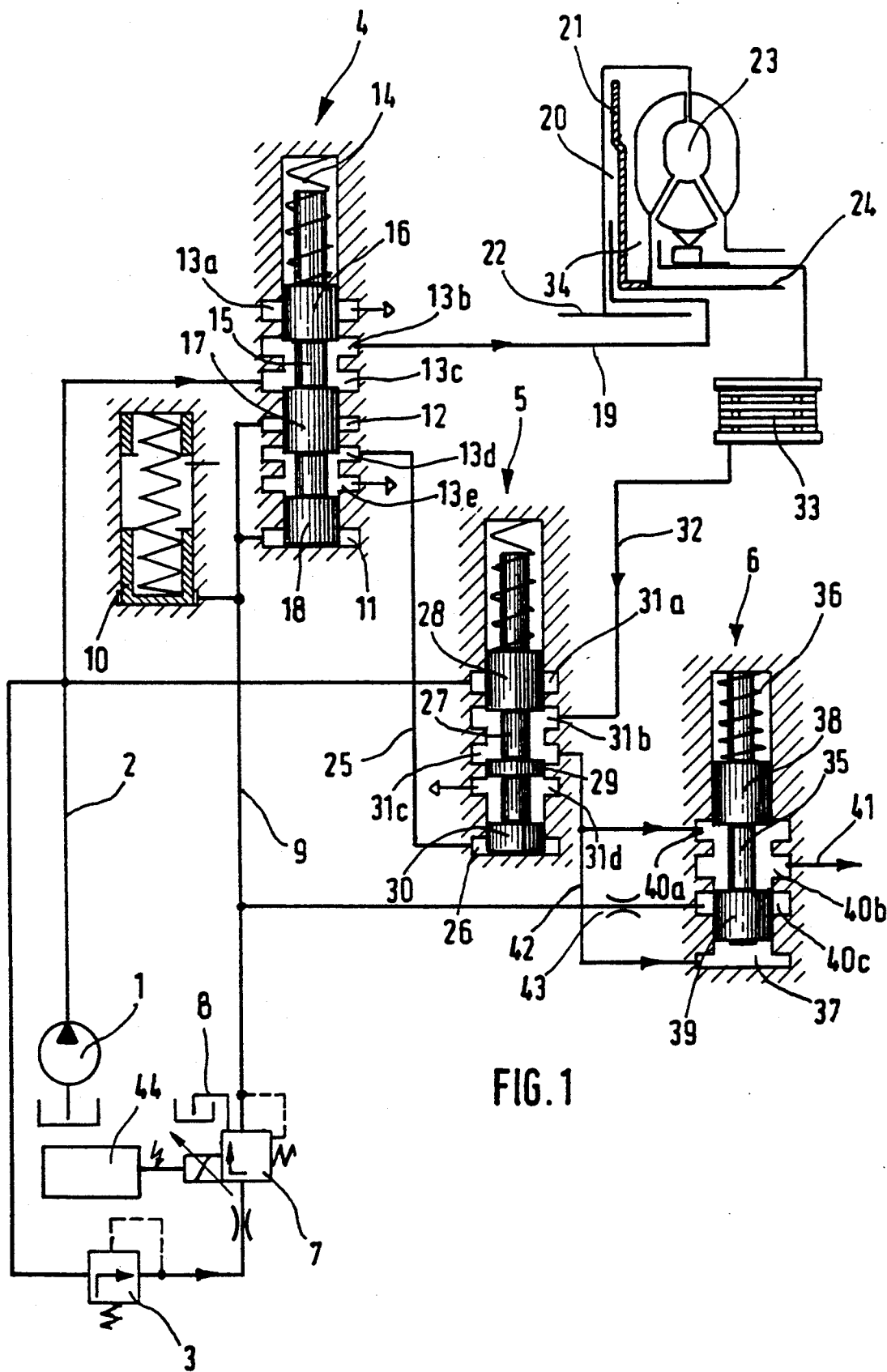
FIG. 1 shows an apparatus for regulating a clutch with hydraulically pilot controlled regulating valves.
Figure 2:
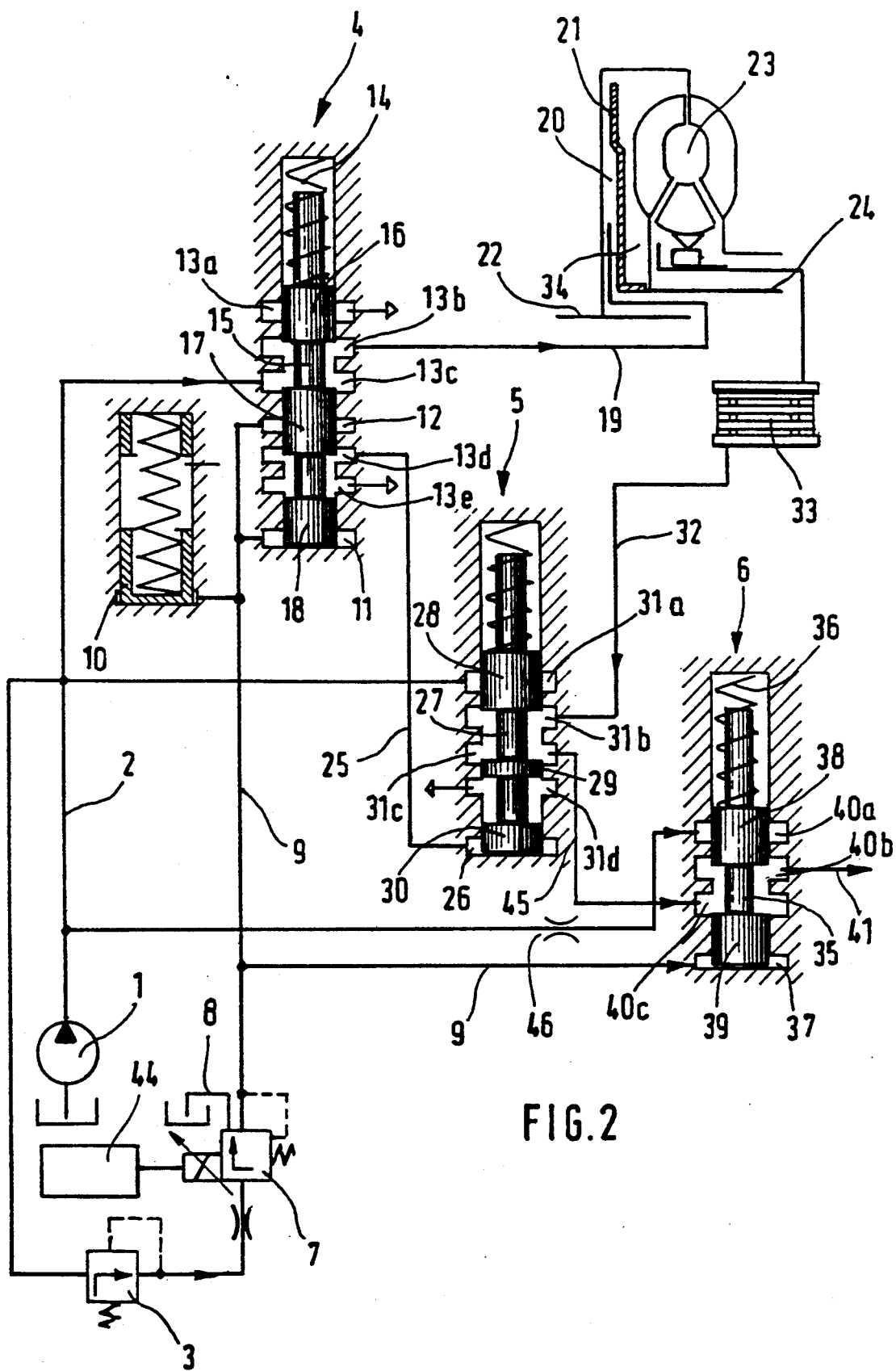
FIG. 2 shows an alternative embodiment of an apparatus for regulating a clutch.

In FIG. 1 and 2, a hydraulic pump 1 conveys pressurized fluid into a main pressure line 2. The main pressure line 2 is attached to a pressure-reducing valve 3, a first regulating valve 4, a second regulating valve 5 and a lubrication valve 6. Inserted after the pressure-reducing valve 3 is a pressure-control valve 7 which, proportionally to the current, opens or closes a discharge line 8 to a tank. Said pressure-control value 7 is actuated by a control unit 44 and controls the pressure in its output-side pilot control line 9. Said pilot control line 9 is attached to a damping element 10, as well as to a end-face pilot control space 11 and a control space 12 of the first regulating valve 4. In addition, the first regulating valve 4 has five annuli 13a and 13e whose feeding and discharge of pressurized fluid is controlled by a piston slide valve 15 displacable against the tension of a spring 14 and having control pistons 16, 17 and 18. The first annulus 13a is open toward the pressurized fluid discharge while the second annulus 13b is attached via a first actuation line 19 to a first actuation space 20 of a friction clutch 21. Said friction clutch 21 serves as a converter bridging clutch. When the friction clutch 21 disengages, torque is transmitted to an output shaft 24 via a hydrodynamic torque converter 23 from an input shaft 22. The friction clutch 21 is shifted parallel with said hydrodynamic torque converter 23 so that when the friction clutch 21 is fully engaged the entire torque is transmitted slip-free via the friction clutch 21 from the input shaft 22 to the output shaft 24.

The annulus 13c of the first regulating valve 4 is attached to the main pressure line 2 while a connecting line 25 serves to connect the annulus 13d to an end-face pilot control space 26 of the second regulating valve 5. Finally, the annulus 13e is open for the discharge of pressurized fluid.

The second regulating valve 5 has a control slide 27 with control pistons 28, 29 and 30. In the interior of the second regulating valve 5 there are situated, aside from the end-face pilot control space 26, annuli 31a to 31d. The annulus 31a is attached to the main pressure line 2 while the annulus 31b is attached to a second actuation space 34 of the friction clutch 21 via a second actuation line 32 within which is situated a radiator 33. The lubrication valve 6 shown in FIG. 1 and 2 has a slide valve 35 which on the end-face has a spring 36 and opposite thereto a control space 37. The slide valve 35 is provided with control pistons 38 and 39 which control the annuli 40a, 40b and 40c. The annulus 40b is attached to a lube oil line 41 which leads to lubrication points of the motor vehicle transmission, not shown in detail.

In the embodiment of FIG. 1, a branched line 42 leads from the annulus 31c of the second regulating valve 5 to the control space 37 of the lubrication valve 6. The annulus 40c is attached to the main pressure line 2 with intercalation of a throttle 43.

The operation of the hydraulic control device according to FIG. 1 is as follows. Via the pressure-reducing valve 3 there is adjusted in the pilot control line 9, a constant control pressure reduced in comparison with the main pressure and modifiable only by the position of the pressure-control valve 7 which is adjusted by the control unit 44 and opens or closes the discharge line 8 proportionally to the current. If said discharge line 8 is opened by the pressure-control valve 7—as shown in FIG. 1—a lower pilot control pressure acts on the end-face pilot control space 11 of the piston slide valve 15 and said piston slide valve 15 is moved by the tension of the spring 14 to its lowest position. Since the main pressure line 2 is connected via the annuli 13b and 13c with the first actuation line 19, there builds up in the first actuation space 20 of the friction clutch 21 an actuation pressure which acts in the direction of a disengaging operation of the friction clutch 21. Since the end-face pilot control space 26 of the second regulating valve is opened via the connecting line 25 and annuli 13d and 13e toward the discharge, said valve 5 is in its lower position as well as connecting the second actuation line 32, via annuli 31b and c, and the line 42 with the control space 37 of the lubrication valve 6. The slide valve 35 of the lubrication valve 6 is moved against the tension of the spring 36 to its upper position in which the pressurized fluid existing in the line 42 can reach the lube oil line 41 via the annuli 40a and 40b of said valve.

If the pressure-control valve 7 is moved by the control unit 44 to a position in which the discharge line 8 is more or less blocked, then the pilot control pressure rises in the pilot pressure line 9 and consequently in the end-face pilot control space 11 of the regulating valve 4 so that the piston slide valve 15 thereof moves to a position in which pressurized fluid is removed from the first actuation space 20 of the friction clutch 21 via the annuli 13b and 13a. Starting from the control space 12 via the annulus 13d, the pilot control pressure likewise reaches, through the connecting line 25, the end-face pilot control space of the second regulating valve 5. The control slide 27 is thereby moved with a delay against the spring tension and connects the main pressure line 2 with the second actuation space 34, with inclusion of the radiator 33, whereby the friction clutch 21 is moved to its engaged position. In this position of the second regulating valve 5, pressurized fluid is removed from the line 42 via the annuli 31c and 31d so that the slide valve 35 of the lubrication valve 6 is moved by the spring 36 to its lower position. Pressurized fluid now reaches the lubrication points from the main pressure line 2 via the annuli 40b and 40c of the lubrication valve 6. According to the invention, during the control operation of the friction clutch, slip conditions are adjusted with this electro-hydraulic device in which a controlled pressure level predominates in the actuation spaces 20 and 34 of the friction clutch 21.

Unlike in FIG. 1, in FIG. 2 the pilot control pressure is fed directly from the pilot control line 9 to the lubrication valve 6 in the control space 37 thereof. From the annulus 31c of the second regulating valve 5, a line 45 leads to the annulus 40c of the lubrication valve 6. The main pressure line 2 is directly attached to the annulus 40a, and a throttle 46 is situated in this leg of the main pressure line. The operation of the device of FIG. 2 is as follows. Coinciding with the design of FIG. 1, a certain actuation pressure builds up in the actuation spaces 20 and 34 depending on the positions of the directional valves 4 and 5 controlled via the control pressure in the pilot control line 9. If the pressure in the pilot control line 9 is relatively low, then the slide valve 35 of the lubrication valve 6 is in its lower position, and pressurized fluid from the second actuation space 34 is connected with the inner space of the converter being fed to the points of lubrication. If the pressure rises in the pressure space 37 of the lubrication valve 6, then the slide valve 35 creates through the annuli 40a and 40b a communication between the main pressure line 2 and the lube oil line 41.

Figure 3:
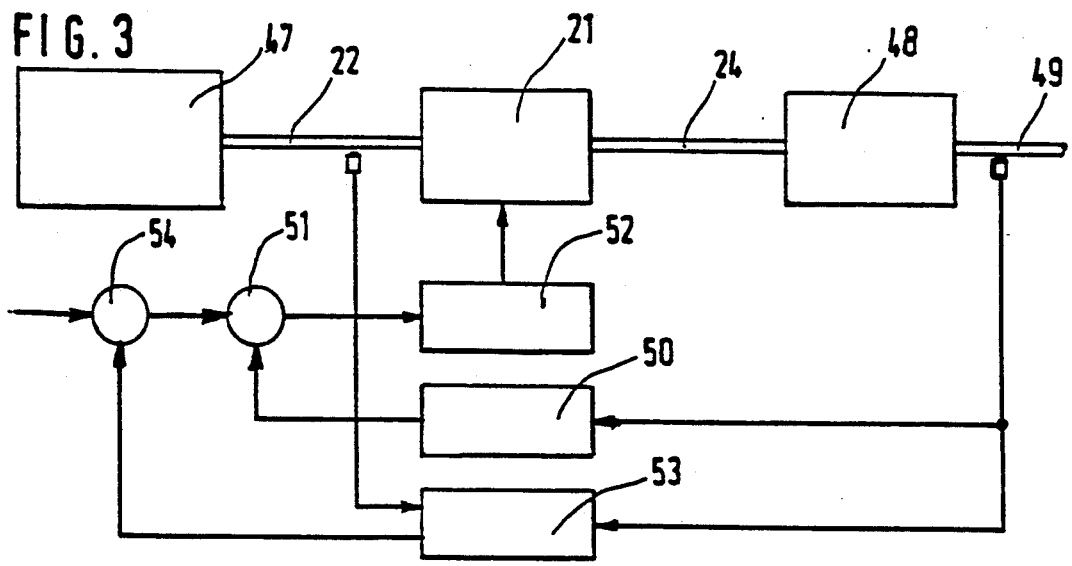
FIG. 3 shows a block diagram of a first embodiment of a control circuit for a regulated clutch.

FIG. 3 shows a block diagram of a first embodiment of the regulation of the clutch according to the invention. In the diagrammatic illustration, 47 designates a prime mover of the motor vehicle which actuates the regulatable clutch 21 via the drive shaft 22 already shown in FIG. 1 and 2. The output shaft 24 leads from the clutch 21 on the output side to a transmission unit 48 which can be designed, for example, as a motor vehicle transmission. Finally, an output shaft 49 exits from the transmission unit 48. A controlled-variable computer unit 50 in this case continuously detects the rotation-rate difference $\Delta\omega$ of the output shaft 49 as a dimension of the regularity of rotation. The rotation-rate difference $\Delta\omega$ can also be detected on the output side of the clutch, on the output shaft 24, or shafts and gears of the transmission unit 48. The rotation-rate difference $\Delta\omega$ is fed as actual valve x to a comparator unit 51, said comparator unit 51 determining a control error $x_w$ from a preset fixed desired value w. The desired valve w represents a magnitude of the torsional irregularity $\Delta\omega_{max}$ of the output shaft 49, of the output shaft 24, or of the elements of the transmission unit 48 in which said irregularity is a upper limit valve which does not result in noises in the power train and in the body parts. With the control error $x_w$, a regulator 52 determined a correcting variable y according to a specific algorithm (clutch pressure or clutch travel) which allows the clutch 21 to slip in a manner such that the rotation-rate difference $\Delta\omega$ with its actual valve x does not exceed, or only immaterially exceeds, the preset desired value (limit value). A small clutch slip normally suffices to damp vibrations of the power train. Said slip is detected by a maximum-slip monitoring unit 53. Only upon reaching or exceeding a present maximum slip for a long period of time does the maximum-slip monitoring unit 53 issue a preset correcting value K, which controls the desired valve w via another comparator unit 54 so that the slip of the clutch 21 is quickly reduced or the clutch 21 entirely disengaged. There obviously exists the possibility of also detecting the clutch slip $\Delta n$ between the input shaft 22 and the output shaft 24 and the rotation-rate difference $\Delta\omega$ can be detected by sensors on the output shaft 24 or within the transmission unit 48.

Figure 4:
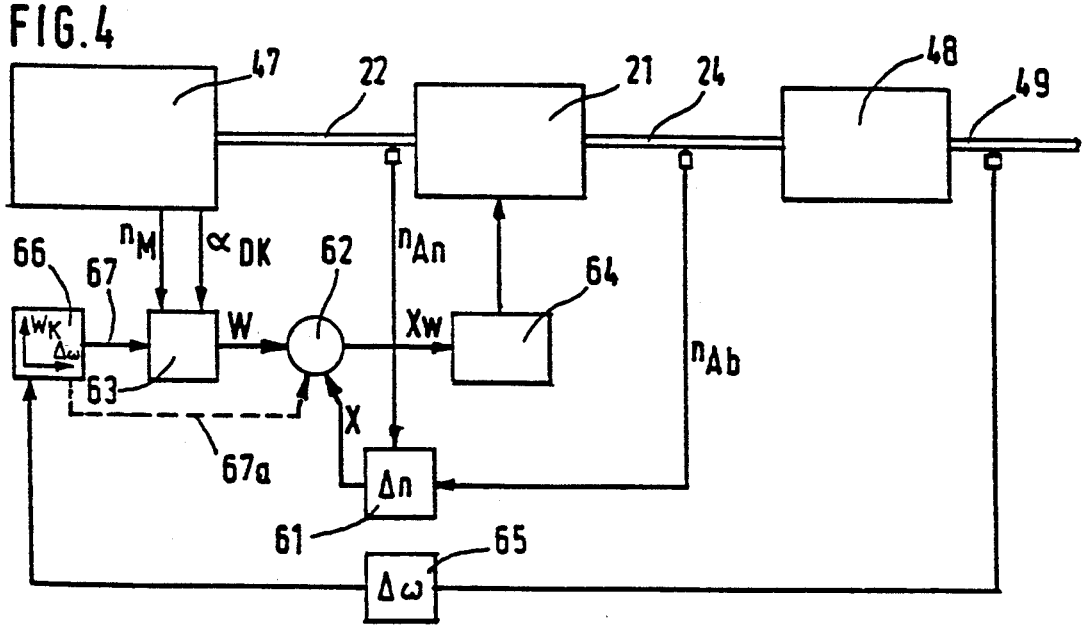
FIG. 4 shows a block diagram of a second embodiment of a control circuit for a regulated clutch.

FIG. 4 shows a block diagram of a second embodiment of the process for regulating the slip condition of a clutch to reduce transmission or drive train noises. In the diagrammatic illustration, 47 again designates the prime mover of the motor vehicle which actuates the regulatable clutch 21 via the input shaft 22. On the output side, the output shaft 24 leads form the clutch 21 to the transmission unit 48, designed as a motor vehicle transmission. From the transmission unit 48 exits an output shaft 49. A controlled-variable computer unit 61 continuously detects a differential speed $\Delta n$ from the speeds of the input shaft 22 and of the output shaft 24 and feeds it as an actual value x to a comparator or adding unit 62. Operational parameters of the prime mover 47, such as the engine speed $n_M$ and the throttle valve position $a_{DK}$, are fed to a first desired-value pickup 63. On the basis of these parameters the desired-value pickup 63 sends a certain differential speed $\Delta n$ as a desired value w to the comparator or adding unit 62. Based on the comparison of the desired value and the actual value of the differential speed $\Delta n$, a regulator 64 issues a certain correcting variable y to the clutch 21. On this control circuit is superposed a second control circuit having a controlled-variable computer unit 65 which serves to determine, at any given time, the rotation-rate difference $\Delta\omega$ of the output shaft 49. Said controlled-variable computer unit 65 delivers a value for the torsional irregularity and can be attached to any desired shaft or transmission device on the output side of the clutch 21. The rotation-rate difference $\Delta\omega$ is fed to a second desired-value pickup 66 which optionally can act, via a path 67, upon the first desired-value pickup, or can alternatively, via a path 67a, cumulatively superpose the first desired value delivered by the first desired-value pickup 63 to the comparator or adding unit 62.

The mode of operation of the device is as follows. The controlled-variable computer unit 61 continuously detects the differential speed $\Delta n$ on the basis of the input and output speeds of the clutch 21 and feeds this value x to the comparator or adding unit 62 which receives from the first desired value pickup 63 a desired value w formed on the basis of the operational parameters of the prime mover 47. Based on said operational parameters the desired value is modified in a manner such that under normal conditions no body buzzings appear in the motor vehicle. But if the rotation-rate difference $\Delta\omega$ assumes a value in which, as known from experience, body buzzing occurs, then the second desired-value pickup 66 issues a second desired value, said second desired value being adapted to the desired value w of the first desired-value pickup 63 in a manner such that the latter issues an increased desired value. There further exists the possibility that the second desired value directly acts cumulatively upon the comparator or adding unit 62. The first desired value pickup 63 detects the operational parameters with which it was adapted by the second desired-value pickup 66 so that upon reappearance of the same operational parameters $a_{DK}$, an increased desired value w is issued. Thus a slight clutch slip $\Delta n$ can be first adjusted and then corrected by the second desired-value pickup 66 so as to obtain comfortable operating conditions.

Figure 5:
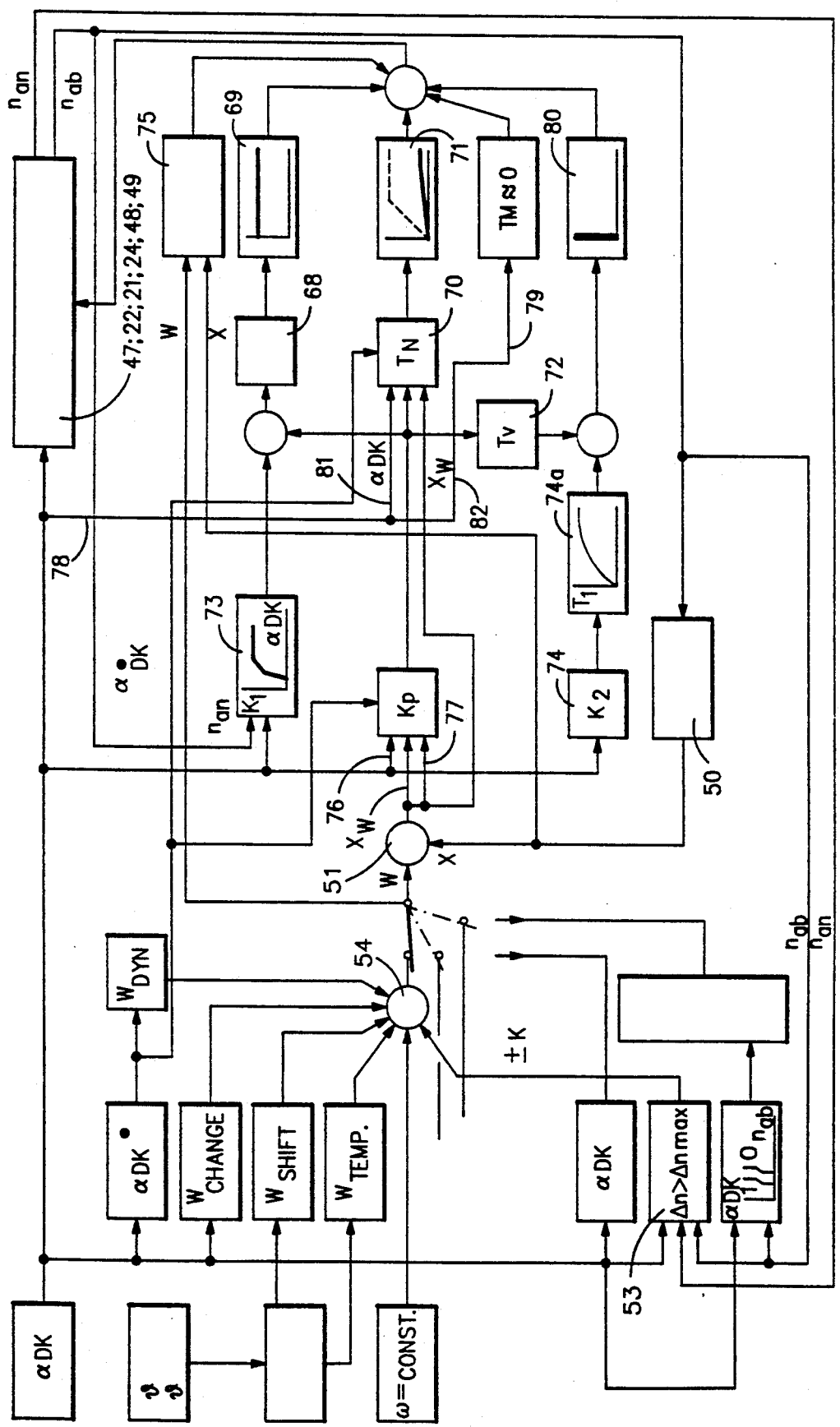
FIG. 5 shows an enlarged block diagram for regulating a clutch according to FIG. 3.

FIG. 5 shows an enlarged block diagram that contains a basic control circuit according to FIG. 3. The functions of the prime mover 47, the input shaft 22, the clutch 21, output shaft 24, the transmission unit 48 and the output shaft 49 are condensed in a common block. Coinciding with FIG. 3, from the speed $n_{ab}$ (a speed on the output side of the clutch 21) and via the controlled-variable computer unit 50, the rotation-rate difference $\Delta\omega$ is determined and fed to the comparator unit 51. In the adding unit 54 the command variables of the following operational parameters of the motor vehicle are entered: load-variation speed $a_{DK}$, $w_{change}$ as change from traction to coating operation, $w_{shift}$ for a shift operation of the transmission of the motor vehicle and $w_{temp}$ as value for the temperature of the cold water of the prime mover. The regulator has a P-portion characterized by blocks 68 and 69. In addition it has an I-portion characterized by blocks 70 and 71. Finally, the regulator also has a D-portion shown by blocks 72 and 80. A control value $K_1$ acts upon the P-portion, the load acts directly upon the I-portion depending on the throttle valve position $ahd$ DK and/or $a_{DK}$ and/or $x_w$, and a correcting value $K_2$ acts upon the D-portion.

Figure 6:
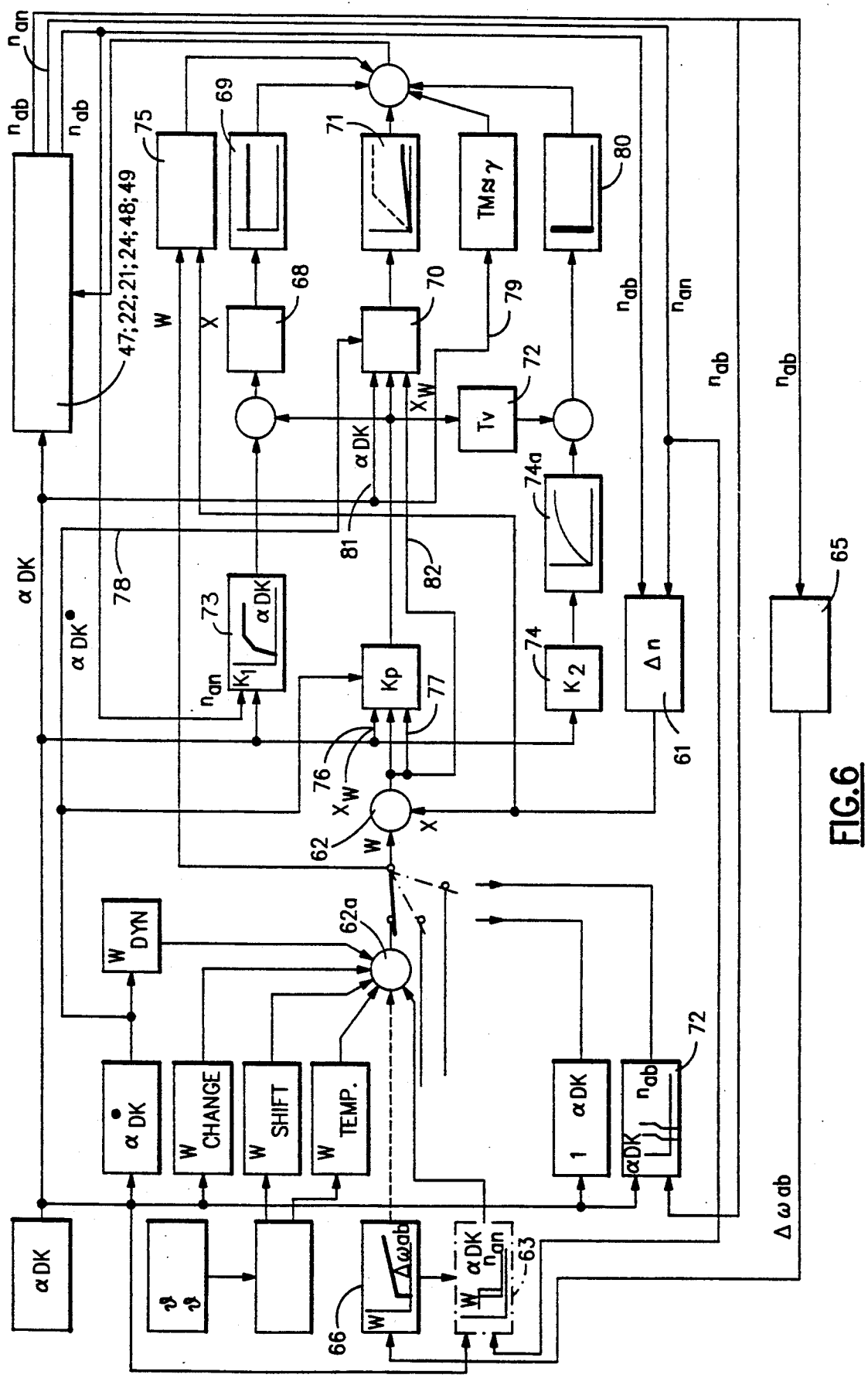
FIG. 6 shows an enlarged block diagram for regulating a clutch according to FIG. 4.

FIG. 6 shows an enlarged block diagram of FIG. 4. A block is again shown as a control system which contains the functions of a prime mover 47, input shaft 22, clutch 21, output shaft 24, transmission unit 48 and output shaft 49. The speed $n_{an}$ and $n_{ab}$ of the input shaft 22 and of the output shaft 24 are fed to the controlled-variable computer unit 61 which forms the value of the speed difference $\Delta n$ and feeds it to the comparator or adding unit 62 as an actual value x. A second controlled-variable computer unit 65, based on the speed $n_{ab}$, detects rotation-rate differences $\Delta\omega_{ab}$ and feeds said value to the second desired value pickup 66. The first desired value pickup 63 forms a first desired value w on the basis of the operational parameters; engine load from throttle valve position $a_{DK}$ and engine speed $D_M$. Depending on the design, the second desired-value pickup 66 can act adaptively upon the first desired-value pickup 63 or the second desired value is directly fed to the comparator or adding unit 62 and added to the first desired value (shown as a dotted path).

There are separate functions which increase the desired value and thus act upon the regulator. Thus, on one hand, the load-change rotation rate $a_{DK}$ is detected and fed as command variable $W_{dyn}$ to the comparator or adding unit 62. Shown as command variable $W_{change}$ is a sensor device which detects the engine load and acts upon the desired value in a manner such that below a certain engine load (in a traction as well as a coasting operation) an increased differential speed $\Delta n$ is adjusted. The device designed as command variable $w_{shift}$ monitors shift operations of the vehicle transmission 48. The device indicated in the block command variable $w_{temp}$ operates so that the clutch can be more or less engaged or disengaged depending on the temperature of the cold water of the prime mover or on the oil temperature of the transmission of the motor vehicle. A block 72 disengages the clutch at a low speed $n_{ab}$, and a block 73 adjusts, depending on the engine load, a certain engaging force of the clutch. A block 74 with a rear-mounted time-function element 74a and the D-element 80 causes a dynamic behavior of the control variable y and of the engaging force of the clutch so that, in the case of quick engine load, it is possible to compensate delayed control variable changes and delay effective changes in the engaging force of the clutch. A block 75 effects a quick disengaging of the clutch according to the preset temporary gradient when the differential speed $\Delta n$ falls below its desired value and additionally falls below another threshold below the desired value, with the object or preventing the tendency of the clutch to disengage.

The regulating equipment has a proportional part changed depending on the engine load $a_{DK}$ so that as the $a_{DK}$ value increases the proportional part becomes enlarged (path 76). The proportional part is changed depending on the error $x_w$ via a path 77 so that the proportional part becomes enlarged as the control errors are greater. Upon a quick change of the engine load, the integral part of the regulating equipment is changed via a signal path 78, in the sense that its engagement becomes stronger than when the engine load is constant or changes only slowly so that the tendency of the differential speed $\Delta n$ to deviate far from its desired value is reduced when the engine load changes quickly. Finally, there is also provided a signal path 79 which monitors the torque flow the clutch, and when no torque flow takes place, sets the control variable y to zero, starting from where the control starts again when a renewed torque buildup takes place.

Figure 7:
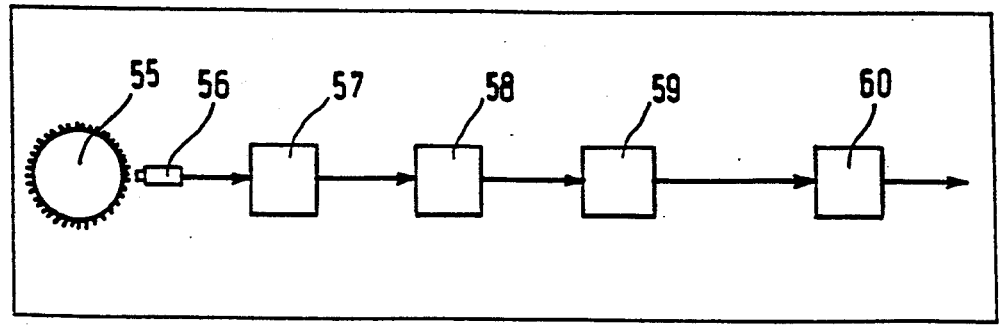
FIG. 7 is a diagrammatic illustration of an electronic device for detecting differences of speed and rotation rate.

FIG. 7 diagrammatically shows an electronic device for detecting the speeds and rotation-rate differences. A slotted disc 55 acts together with a speed sensor 56, the detected speed values being fed to a pulse cam processor consisting of a pulse shaper 57 and a mono-flop 58. Said pulse cam processor produces for the respective input speed exactly the same pulse cams. The pulse sequences transverse a band-pass filter 59 which determines residual ripple and simultaneously the selective angle data of the rotation-rate signal. Said signal transverses a step 60 whose output voltage has a direct relation to the actual value x of the rotation-rate difference $\Delta\omega$ or of the shaft speed.

We claim:

1. A process for regulating a clutch situated in a power train between an input and an output shaft to reduce unwanted noise occurring therein, in which a sensor device (55, 56) is provided for detecting a rotation-rate difference $\Delta\omega$ in the power train and regulating equipment (52), depending upon a control variable detected by the sensor device, controls a correcting variable y to be fed to the clutch to control a speed difference $\Delta n$ to reduce unwanted power train noise, the process comprising the steps of:

providing the regulating equipment (52) with a comparator unit (51), and comparing with said comparator unit (51) an actual value x of the rotation-rate difference $\Delta\omega$ detected for the output shaft of the power train with a limit value $w_{const}$, and limiting the rotation-rate difference $\Delta\omega$ to the limit value $w_{const}$, upon the equal value x at least of reaching and exceeding the limit value $w_{const}$, by changing the correcting variable y of the clutch (21).

2. A process for regulating a clutch according to claim 1 further comprising the step of:

providing an additional first signal path through which during quick changes of the engine load, a delayed change of the control variable and a retarded change of the clutch engaging force can be compensated, by an adaptation value (74), a time-function element (74a) and a differential element (80); and the adaptation value (74) and the time-function element (74a) acting as a delayed proportional element and simulating a dynamically delayed behavior of the control variable and of the clutch engaging force.

3. A process for regulating a clutch according to claim 1, further comprising the step of:

connecting said clutch to an internal combustion engine via the input shaft, and coordinating, in the regulating equipment (64), a certain correcting variable y with each value of engine load $a_{DK}$ of the internal combustion engine (47).

4. A process for regulating a clutch according to claim 1, further comprising the step of:

providing an additional first signal path through which, during quick changes of the engine load, a delayed change of the control variable and a retarded change of the clutch engaging force can be compensated by an adaptation value (74), a time-function element (74a) and a differential element (80); and the adaptation value (74) and the time-function element (74a) acting as a delayed proportional element and simulating a dynamically delayed behavior of the control variable and of the clutch engaging force.

5. A process for regulating a clutch according to claim 1, wherein the clutch is shifted in parallel with a hydrodynamic torque converter located a power train (23) between an internal combustion engine (47) and a transmission (48), further comprising the step of:

automatically biasing the clutch (21) into a disengaged position when one of the a temperature of water of the internal combustion engine (47) and a temperature of oil of the transmission (48) falls below a first temperature limit value.

6. A process for regulating a clutch according to claim 5, further comprising the step of:

providing a second temperature limit value above the first temperature limit value; and increasing the speed difference $\Delta n$ in the clutch (21) when operating the water of the internal combustion engine and the oil of the transmission between the first and the second temperature limit values.

7. A process for regulating a clutch according to claim 1, further comprising the step of:

limiting the speed difference $\Delta n$ between the input and the output shafts (22 and 24 or 49) to one of a maximum value $\Delta n_{max}$ and a maximum slip duration.

8. A process for regulating a clutch according to claim 7, further comprising the step of:

upon one of reaching and exceeding one of the maximum value $\Delta n_{max}$ and the maximum slip duration, varying the limit value $w_{const}$ by a correction value K, depending on an engine load of the internal combustion engine.

9. A process for regulating a clutch according to claim 8, further comprising the step of:

continuously comparing, in the comparator unit (62), the actual value x of the speed difference $\Delta n$ with a desired value w which corresponds to a very small rotation-rate difference $\Delta \omega$; and feeding any error $x_w$ resulting therefrom to the regulating equipment (64) which has a proportional part and an integral part.

10. A process for regulating a clutch according to claim 9, further comprising the step of:

changing the proportional part of the regulating equipment, according to the engine load $a_{DK}$, so that the proportional part becomes greater as the engine load increases.

11. A process for regulating a clutch according to claim 9, further comprising the step of:

changing the integral part of the regulating equipment, so as to reinforce control of the integral part, depending upon one of the error $x_w$, the engine load $a_{DK}$ and quick changes in engine load $a_{DK}$.

12. A process for regulating a clutch according to claim 9, further comprising the step of:

changing the proportional part according to a load-change speed $a_{DK}$ such that the proportional part becomes greater as the load-change speed $a_{DK}$ increases.

13. A process for regulating a clutch according to claim 12, further comprising the step of:

forming the proportional part according to the error $x_w$ of the comparator unit (62) such that the proportional part becomes greater with greater errors $x_w$.

14. A process for regulating a clutch situated in a power train of a motor vehicle to reduce unwanted droning and buzzing noise occurring therein, the clutch being situated in the power train between an input shaft (22), connected with an internal combustion engine (47), and an output shaft (24), connected with a transmission unit (48), including a pickup device for detecting a speed difference $\Delta n$ of the input and output shafts (22 and 24), a sensor device for detecting a rotation-rate difference $\Delta \omega$ and regulating equipment (64), depending upon a control variable x measured by the pickup device, controlling a correcting variable y to be fed to the clutch (21) to control the speed difference $\Delta n$ to reduce unwanted power train droning and buzzing noise, the process comprising the steps of:

feeding operational parameters of the internal combustion engine (47), which cause the rotation-rate differences $\Delta \omega$ in the power train, to a first pickup (63) coordinated with the regulating equipment (64) and, based on the operational parameters, the first pickup (63) generating a first desired value w of the speed difference $\Delta n$;

feeding the first desired value w and the control variable x to a comparator unit (62) of the regulating equipment (64); and measuring and feeding the rotation-rate difference $\Delta \omega$ to a second desired-value pickup (66), and feeding a second desired value w, depending upon whether the rotation-rate difference $\Delta \omega$ is one of below, above or at a limit value of the rotation-rate difference $\Delta \omega$, to one of the comparator unit (62) and to the first pickup (63) adaptively controlling the first desired value w thereof.

15. A process for regulating a clutch according to claim 14, further comprising the step of:

lowering the control variable y via a second signal path with a preset temporary gradient when the speed difference $\Delta n$ falls below a desired value and additionally falls below a threshold value lying below the desired value.

16. A process for regulating a clutch according to claim 14, further comprising the step of:
providing a pickup element which detects a torque flow $T_M$ of the clutch during at least one of a traction and a coasting operation; and
when no torque flow $T_M$ is present, setting the correcting variable y to zero, from where the control again starts as a new torque buildup occurs.

17. A process for regulating a clutch according to claim 14 further comprising the step of:
detecting engine load of the internal combustion engine (47) as an operational parameter; and
changing the correcting variable y of the clutch (21), to an increased speed difference $\Delta n$ when the engine load is below a certain valve of the engine load in a traction and a coasting operation of the motor vehicle.

18. A process for regulating a clutch according to claim 17, further comprising the step of:
detecting a load-change speed $\alpha_{DK}$ of the internal combustion engine (47); and when exceeding a maximum value $\alpha_{DK\ max}$ of the load-change speed,
increasing a desired value of the speed difference $\Delta n$ of the input and output shafts (22 or 24) when the engine load diminishes, and decreasing a desired value of the speed difference $\Delta n$ of the input and the output shafts (22 or 24) when the engine load is one of increased and kept constant.

19. A process for regulating a clutch according to claim 14, further comprising the step of:
coordinating, in the regulating equipment (64), a certain correcting variable y with each value of the engine load $\alpha_{DK}$ of internal combustion engine (47).

20. A process for regulating a clutch according to claim 19 further comprising the step of:
continuously correcting a static coordination between the value of the engine load $\alpha_{DK}$ and the control variable y corresponding to an engaging force of the clutch (21) such that, at a stationary operation point, the speed difference $\Delta n$ for a predetermined period of time reaches a desired value; and
resetting of the control variable x to a desired value with the regulating equipment even when the static coordination between the value of the engine load $\alpha_{DK}$ and the control variable y has shifted and wherefrom are deduced changed needed for an adaptive coordination between the engine load $\alpha_{DK}$ and the control variable y.

21. A process for regulating a clutch according to claim 14, in which the clutch is shifted in parallel with hydrodynamic torque converter located a power train (23) between the internal combustion engine (47) and the transmission (48), further comprising the step of:
automatically biasing the clutch (21) into a disengaged position when one of a temperature of water of the internal combustion engine (47) and a temperature of oil of the transmission (48) falls below a first temperature limit value.

22. A process for regulating a clutch according to claim 21 further comprising the step of:
providing a second temperature limit value above the first temperature limit value; and
increasing the speed difference $\Delta n$ in the clutch (21) when operating the water of the internal combustion engine and the oil of the transmission between the first and the second temperature limit values.

23. A process for regulating a clutch according to claim 21, further comprising the step of:
providing a second temperature limit value above the first temperature limit value; and
canceling a preset speed difference $\Delta n$, according to a defined characteristic line, when the first temperature limit value is exceeded.

24. A process for regulating a clutch according to claim 21, further comprising the step of:
providing, for a short duration after starting, information regarding at least one of the engine oil temperature and the engine water temperature to the regulating equipment (64) from a control electronic system of the internal combustion engine (47); and
setting, according to this information, a time-dependent characteristic line according to which an increased speed difference $\Delta n$ is canceled.

* * * * *

UNITED STATES PATENT AND TRADEMARK OFFICE
CERTIFICATE OF CORRECTION

PATENT NO. : 5,190,130

DATED : March 2, 1993

INVENTOR(S) : Christian THOMAS, Gerald ROWE, Wolf-Dieter GRUHLE & Wolfgang MAIER It is certified that error appears in the above-identified patent and that said Letters Patent is hereby corrected as shown below:

Column 12, line 65 replace "equal" with --actual-- and after "least" insert --one--.

Signed and Sealed this

Twenty-third Day of November, 1993

Attest:

BRUCE LEHMAN

Attesting Officer

Commissioner of Patents and Trademarks